United States Patent
Budihal et al.

(10) Patent No.: US 10,620,638 B2
(45) Date of Patent: Apr. 14, 2020

(54) METHOD, SYSTEM, AND DEVICE FOR GUIDING AUTONOMOUS VEHICLES BASED ON DYNAMIC EXTRACTION OF ROAD REGION

(71) Applicant: WIPRO LIMITED, Bangalore (IN)

(72) Inventors: Ramachandra Budihal, Bangalore (IN); Ranjith Rochan Meganathan, Ooty (IN); Sujatha Jagannath, Bangalore (IN)

(73) Assignee: Wipro Limited, Bangalore (IN)

( * ) Notice: Subject to any disclaimer, the term of this patent is extended or adjusted under 35 U.S.C. 154(b) by 175 days.

(21) Appl. No.: 15/719,614

(22) Filed: Sep. 29, 2017

(65) Prior Publication Data

US 2019/0056748 A1 Feb. 21, 2019

(30) Foreign Application Priority Data

Aug. 18, 2017 (IN) .............................. 201741029405

(51) Int. Cl.
*G05D 1/02* (2020.01)
*G05D 1/00* (2006.01)
*G06K 9/00* (2006.01)
*G06K 9/78* (2006.01)
*G06K 9/46* (2006.01)
*G06K 9/62* (2006.01)
(Continued)

(52) U.S. Cl.
CPC ......... *G05D 1/0248* (2013.01); *G05D 1/0088* (2013.01); *G05D 1/0212* (2013.01);
(Continued)

(58) Field of Classification Search
CPC .. G05D 1/0248; G05D 1/0253; G05D 1/0212; G05D 1/0088; G05D 2201/0213;
(Continued)

(56) References Cited

U.S. PATENT DOCUMENTS

2015/0206015 A1 7/2015 Ramalingam et al.
2015/0266472 A1 9/2015 Ferguson et al.
(Continued)

FOREIGN PATENT DOCUMENTS

WO 2011032207 A1 3/2011

OTHER PUBLICATIONS

T. Birdal, et al., "Real-Time Automated Road, Lane and Car Detection for Autonomous Driving", (2007), *Faculty of Engineering and Natural Sciences*, pp. 1-5.
(Continued)

*Primary Examiner* — Rodney A Butler
(74) *Attorney, Agent, or Firm* — Finnegan, Henderson, Farabow, Garrett & Dunner, LLP (57) ABSTRACT

A method and system for guiding an autonomous vehicle to extract drivable road region is provided. The method involves capturing the road region ahead of the autonomous vehicle using a plurality of sensors. The road region is captured as a three-dimensional point cloud. Thereafter, a plurality of images of the road ahead the autonomous vehicle is captured using a camera. The captured road region and the plurality of images are mapped and compared. The mapping involves comparing the point cloud with plurality of pixels in the images. Based on the mapping, a training data is dynamically updated to incorporate current road conditions and a drivable road region is predicted. Finally, based on the drivable region, the autonomous vehicle is controlled and guided through the road.

17 Claims, 9 Drawing Sheets

(51) Int. Cl.
  *G06T 7/11* (2017.01)
  *G06T 7/143* (2017.01)
  *G01S 17/89* (2020.01)
  *G01S 17/93* (2020.01)

(52) U.S. Cl.
  CPC ....... *G05D 1/0253* (2013.01); *G06K 9/00201* (2013.01); *G06K 9/00798* (2013.01); *G06K 9/00805* (2013.01); *G06K 9/46* (2013.01); *G06K 9/4652* (2013.01); *G06K 9/4661* (2013.01); *G06K 9/6202* (2013.01); *G06K 9/6226* (2013.01); *G06K 9/6256* (2013.01); *G06K 9/78* (2013.01); *G06T 7/11* (2017.01); *G06T 7/143* (2017.01); *G01S 17/89* (2013.01); *G01S 17/936* (2013.01); *G05D 2201/0213* (2013.01); *G06K 9/00* (2013.01); *G06K 2209/21* (2013.01); *G06K 2209/40* (2013.01); *G06T 2200/04* (2013.01); *G06T 2207/10028* (2013.01); *G06T 2207/20081* (2013.01); *G06T 2207/30256* (2013.01); *G06T 2207/30261* (2013.01)

(58) Field of Classification Search
  CPC . G06T 7/143; G06T 7/11; G06T 2207/30261; G06T 2207/30256; G06T 2207/20081; G06T 2207/10028; G06T 2200/04; G06K 9/6226; G06K 9/4661; G06K 9/4652; G06K 9/00805; G06K 9/6256; G06K 9/46; G06K 9/78; G06K 9/00798; G06K 9/00201; G06K 9/6202; G06K 2209/40; G06K 9/00; G06K 2209/21; G01S 17/936; G01S 17/89
  See application file for complete search history.

(56) References Cited

U.S. PATENT DOCUMENTS

2018/0260639 A1* 9/2018 Kapach .............. G08G 1/09623
2019/0051172 A1* 2/2019 Stenneth .............. G08G 1/0112

OTHER PUBLICATIONS

F. Bounini, et al., "Autonomous Vehicle and Real Time Road Lanes Detection and Tracking", (2015) *IEEE*, pp. 1-6.

S. Graovac, et al., "Detection of Road Image Borders Based on Texture Classification", (2012), *International Journal of Advanced Robotic Systems*, vol. 9, 242:2012, pp. 1-12.

Th. Hong, et al., "Road Detection and Tracking for Autonomous Mobile Robots". (2002), *Proceedings of the SPIE 16th Annual International Symposium on Aerospace on Aerospace/Defense Sensing, Simulation, and Controls*, 2002, pp. 1-9.

S. Kamini, et al., "Colour Vision Based Drivable Road Area Estimation", (2015), *International Journal of Innovative Research & Development*, vol. 4, issue 5, pp. 234-237.

H. Kong, et al., "General road detection from a single image", (2009), *IEEE*, pp. 1-10.

B. Mathibela, et al., "Reading the Road: Road Marking Classification and Interpretation", (2015) *IEEE Transactions on Intelligent Transportation Systems*, vol. 16, No. 4 pp. 2072-2081.

S. Qian, et al., "Road Region Estimation and Obstacles Extraction Using a Monocular Camera", (2013), *International Journal of Innovative Computing, Information and Control*, vol. 9, No. 9, pp. 3561-3572.

S. Vacek, et al., "Road-marking analysis for autonomous vehicle guidance", (2007), *Institute for Computer Science and Engineering*, pp. 1-6.

S. Zhou, et al., "Road Detection Using Support Vector Machine based on Online Learning", (2010), *National Nature Science Foundation*, pp. 1-6.

Dahlkamp, H., et al., "Self-supervised Monocular Road Detection in Desert Terrain", Proceedings of the Robotics Science and Systems Conference, Jan. 1, 2006, 7 pages.

Fleischmann., P, et al., "An Adaptive Detection Approach for Autonomous Forest Path Following using Stereo Vision", IEEE, Nov. 13, 2016, 6 pages.

Extended European Search Report issued in the European Patent Office in counterpart European Application No. 17209186.0, dated Jun. 28, 2018, 7 pages.

\* cited by examiner

METHOD, SYSTEM, AND DEVICE FOR GUIDING AUTONOMOUS VEHICLES BASED ON DYNAMIC EXTRACTION OF ROAD REGION

TECHNICAL FIELD

This disclosure relates generally to guiding autonomous vehicles and more particularly to method, system, and device for guiding autonomous vehicles based on dynamic extraction of road region.

BACKGROUND

Autonomous vehicles are programmed to automatically drive through a road based on pre-defined conditions. Such vehicles also utilize real-time sensors and processing systems to identify current road conditions and make intelligent decisions about guiding the autonomous vehicles based on road region. Therefore, the sensors and processing systems need lot of input data processing capabilities for identifying the road region based on different type of roads. The different type of road conditions can be based on terrain of the road, vehicles present on the road, other vehicles travelling on the same road, other vehicle's position w.r.t to the autonomous vehicle etc. and sometimes other vehicle's movement around the autonomous vehicle can also be varying.

Further, there can be situations where the road region is entirely occluded by objects and no road region is visible to the system. Considering all above situations, the autonomous vehicle system should be intelligent enough not to map the occluded objects as drivable road region, identify actual road texture information depending on the geographical area and weather conditions, the drivable road region identification should neglect the obstacles that are present in the input scene to focus only on the drivable road region for collision free smooth navigation and finally, the system should be robust and self-adapting to safely navigate through the drivable road regions.

Currently available solutions use different schemes for road region extraction but works only on structured roads or fails in meeting the road region detection accuracy. Hence, novel system and method is needed for robust road region extraction for safe autonomous vehicle navigation.

SUMMARY

In one embodiment, a method for guiding an autonomous vehicle to extract drivable road region is provided. The method involves capturing the road region ahead of the autonomous vehicle using a plurality of sensors. The road region is captured as a three-dimensional point cloud. Thereafter, a plurality of images of the road ahead the autonomous vehicle is captured using a camera. The captured road region and the plurality of images are mapped and compared. The mapping involves comparing the point cloud with plurality of pixels in the images. Based on the mapping, a training data is dynamically updated to incorporate current road conditions and a drivable road region is predicted. Finally, based on the drivable region, the autonomous vehicle is controlled and guided through the road.

In another embodiment, a vehicle guiding system is disclosed. The vehicle guiding system includes a plurality of sensors. The plurality of sensors are configured to capture a road region ahead of the autonomous vehicle, such that the road region is captured as point cloud. The vehicle guiding system also includes a camera for capturing a plurality of images of the road ahead of the autonomous vehicle. The camera and the plurality of sensors are coupled to a processor and a memory having processor instructions stored thereon, causing the processor, on execution to map the road region to the plurality of images, wherein the three-dimensional point cloud is mapped to a plurality of pixels within the plurality of image and predict a drivable region of the road based on the mapping and the training data. The vehicle guiding system further including a vehicle control system configured to control the autonomous vehicle based on the predicted drivable region of the road.

In yet another embodiment, a non-transitory computer-readable storage medium is disclosed. The non-transitory computer-readable storage medium has instructions stored thereon, a set of computer-executable instructions causing the vehicle guiding system that includes one or more processors to perform steps including capturing the road region ahead of the autonomous vehicle using a plurality of sensors. Then capturing the plurality of images of the road ahead the autonomous vehicle using a camera. Mapping the captured road region and the plurality of images by comparing the point cloud with plurality of pixels in the images. Then based on the mapping, updating the training data dynamically to incorporate current road conditions and predicting the drivable road region. Finally, controlling and guiding the autonomous vehicle based on the drivable region.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
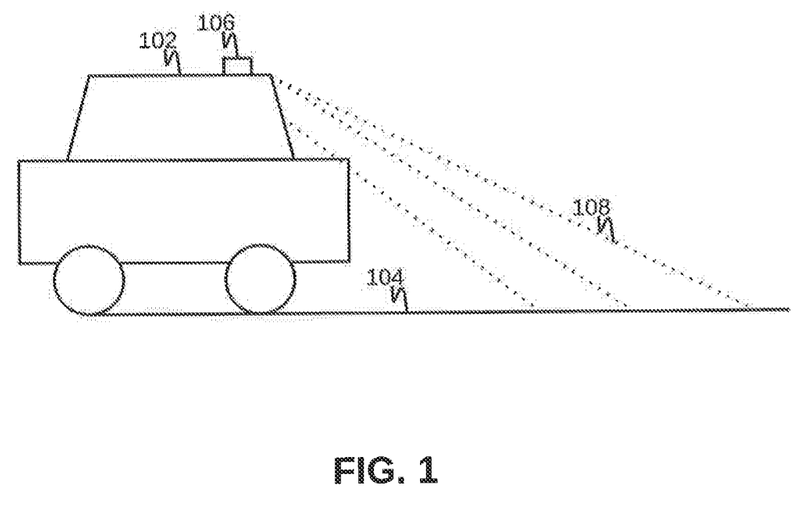
FIG. 1 illustrates an autonomous vehicle system, in which various embodiments may be employed.

Additional illustrative embodiments are listed below. In one embodiment, an autonomous vehicle 102 is provided. Autonomous vehicle 102 is an automatically navigating car such as a driver less car or an unmanned car. Such vehicles include control systems for guiding and navigation of autonomous vehicle 102. The control system may be hosted in autonomous vehicle 102 or may be hosted remotely for control and navigation. Autonomous vehicle 102 automatically drives through a road 104.

Autonomous vehicle 102 further includes a sensor system 106. As shown in FIG. 1, sensor system 106 is mounted on autonomous vehicle 102. Alternately, sensor system 106 may be positioned at any appropriate point of autonomous vehicle 102. Sensor system 106 includes one or more sensors. In an embodiment, sensor system 106 includes a Light Detection and Ranging (LiDAR) sensor and an Inertial Measurement Unit (IMU). Sensor system 106 emits a plurality of scan lines 108 to road 104. Plurality of scan lines 108 help in identifying texture of road 104. Sensor system 106 may also include a camera for capturing images of road 104. The camera captures images of the road ahead of autonomous vehicle 102. Autonomous vehicle 102 to guided and navigated to reach its destination based on drivable region of road 104. This scenario is further explained in detail in conjunction with FIG. 2.

Figure 2:
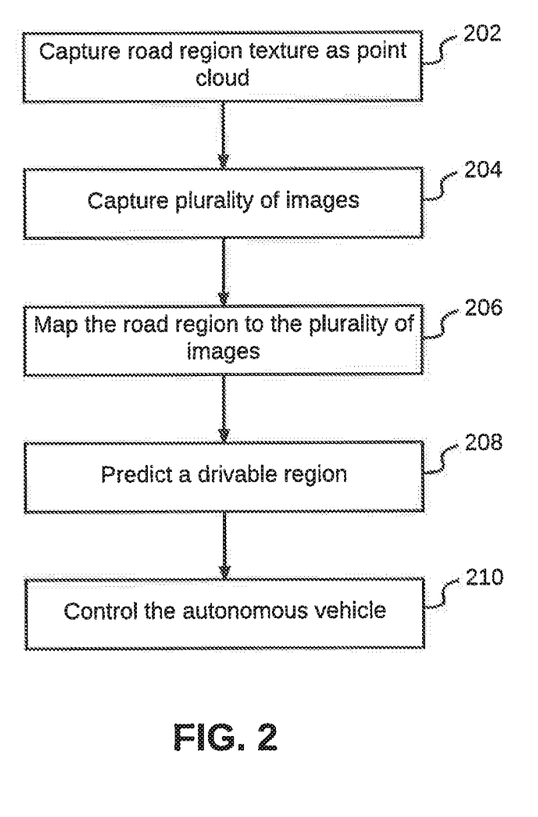
FIG. 2 illustrates a flow chart of method for guiding an autonomous vehicle, in accordance with an embodiment

Referring now to FIG. 2, a flowchart of a method for guiding autonomous vehicles based on dynamic extraction of road region is illustrated, in accordance with an embodiment. The autonomous vehicle may be autonomous vehicle 102 as discussed in FIG. 1. At step 202, a road region texture is captured for the road ahead of the autonomous vehicle. The road region texture is captured using a plurality of sensors. The plurality of sensors corresponds to sensor system 104, as discussed in FIG. 1. The plurality of sensors includes LiDAR sensor and IMU sensor. In addition, there may be more sensors used to extract all the required information related to the road region texture.

Initially, terrain condition of the road is identified using the LiDAR sensor and IMU sensor. The terrain conditions include slope of the road ahead of the autonomous vehicle and three-dimensional texture of the road. The slope is identified using IMU sensors. The slope ahead of the vehicle may be flat, positive inclined, or negative inclined. Based on the slope, further three-dimensional texture is identified for a ground region ahead of the autonomous vehicle in the form of a point cloud. This helps in accurately determining the ground region in 3D coordinate system. The entire 3D data of the scene is captured using the LiDAR sensor that provides all inertial data like roll, pitch and yaw which is useful in identifying the terrain. In an embodiment, the LiDAR sensor is mounted above the autonomous vehicle along a height at which ground points for the road ahead can be extracted.

The LiDAR sensor emits a plurality of scan lines to capture texture of the road. The scan lines are used to formulate a three-dimensional point cloud of the capture ground region of the road. If the point cloud directly points to the ground region then with appropriate thresholding, all the points representing the ground are extracted. In a scenario, the entire ground region may not be drivable as the road may have certain characteristics. To capture the ground region, trailing frames of LiDAR is taken for consecutive frames and for each point gradient is determined for all directions. If the gradient's magnitude and directions exceed a certain threshold, it is considered as the boundary of the road. As the curbs present in the boundaries can have sharp gradients it will be considered as boundaries. Accordingly, the three-dimensional point cloud of the road region based on ground region, terrain conditions, and slope of the road is identified.

The three-dimensional point cloud is suitable for providing road region of any type of surface, independent of structure and texture of the road. Additionally, given any road conditions like village or urban or deserted roads with any weather conditions along with multiple obstacles present in the road, the solution excludes the obstacles region and concentrates only on the vehicle drivable region.

Thereafter, at step 204, a plurality of images is captured of the road ahead of the autonomous vehicle using a camera. The camera captures a field of view ahead of the autonomous vehicle. The field of view includes one or more images of the road ahead. The field of view also depends on mounting and height of the camera. The camera may be mounted on top or at mid-level of the autonomous vehicle. Accordingly, one or more images corresponding to the field of view are captured. In this step, the one or more images from the camera are analyzed for detecting the field of view in vertical & horizontal directions, image height & width parameters in pixels. Accordingly, a plurality of pixels of the one or more images are identified. The plurality of pixels provides pixels per degree for both azimuth and elevation angle, thus providing spherical coordinates of the one or more images. The one or more images are utilized to identify free space marked pointed in the field of view with good accuracy and learn visually how a drivable region is present in the road ahead of the autonomous vehicle.

Then at step 206, the road region as identified in step 202 is mapped with the plurality of images as identified in step 204. The LiDAR sensor provides dense information only for shorter distance, therefore the plurality of images is mapped to extract the road region in images to navigate the autonomous vehicle faster and better. In this step, the three-dimensional point cloud is mapped to the plurality of pixels as identified for one or more images. The mapping is further explained in conjunction with following figures.

Based on mapping as obtained in step 206, a drivable region for the autonomous vehicle is predicted at step 208. In this step, initially a training data is identified. The training data is dynamically updated information about the road. The training data is developed by learning and updating past data about the road. Information about the ground region of the road is extracted from the three-dimensional point cloud and the one or more images captured using the camera. Thereafter, the training data and the mapping data as obtained in step 208 are utilized to predict the drivable region of the road. The drivable road region is a free region or a region of the road, where the autonomous vehicle can drive through. Hence such region will have a terrain with the drivable region and less of such obstacles due to which the autonomous vehicle cannot move. The training data and prediction of the drivable region is further explained in detail in following figures.

Thereafter, at step 210, the autonomous vehicle is controlled and guided to drive through along the road based on the drivable region. The autonomous vehicle is guided to a destination based on best possible path making the navigation smoother throughout the course of route. The drivable region of the road is provided to a control system of the autonomous vehicle for decision making towards the navigation. The control system allows to understand position of the autonomous vehicle with respect to structured/unstructured road region and allows the navigate through all possible paths present in the road region even if more obstacles are present in it. The control system identifies a threshold value of the drivable region. The threshold defines available value of the drivable region of the road, i.e. area available through which the autonomous vehicle can pass through. In case, the drivable region is above a given threshold, the autonomous vehicle can be maneuvered in the given drivable region. However, in case the road has an obstacle and the drivable region is below a defined threshold, then the control system halts the autonomous vehicle and further processing is limited.

Thus, overall the autonomous vehicle is guided with more precision and accuracy. The proposed method uses dynamic ground region extraction using LiDAR and IMU sensors to extract the ground region based on the slope of the terrain in the form of point cloud. This helps in accurately determining the ground region in three-dimensional coordinate system and the method works for any surface, independent of structure and texture of the road. Additionally, given any road conditions like village or urban or deserted roads with any weather conditions along with multiple obstacles present in the road, the method excludes the obstacles region and concentrates only on the vehicle drivable region.

Initially, the road region training and predicting involves learning the ground region present in the one or more images and predicts the rest of image allowing extraction of the ground region visually and more accurately. Additionally, training in dual color patches of RGB and LUV color space is done to overcome various lighting conditions. Also, the proposed method can extract road region on any kind of terrain and roads, for example: curved roads, straight roads, terrain with both positive and negative slopes without any modifications and the road region is marked according to the obstacles present in the system. Hence it makes the method robust to extract only the ground region despite of having any number of obstacles on the vehicle path and overcomes the major effects that are caused by the surrounding environment (impose in an image like lighting conditions, structure of the road, terrain elevations, other obstacles (vehicles) present on road) to guide the autonomous vehicle.

Figure 3:
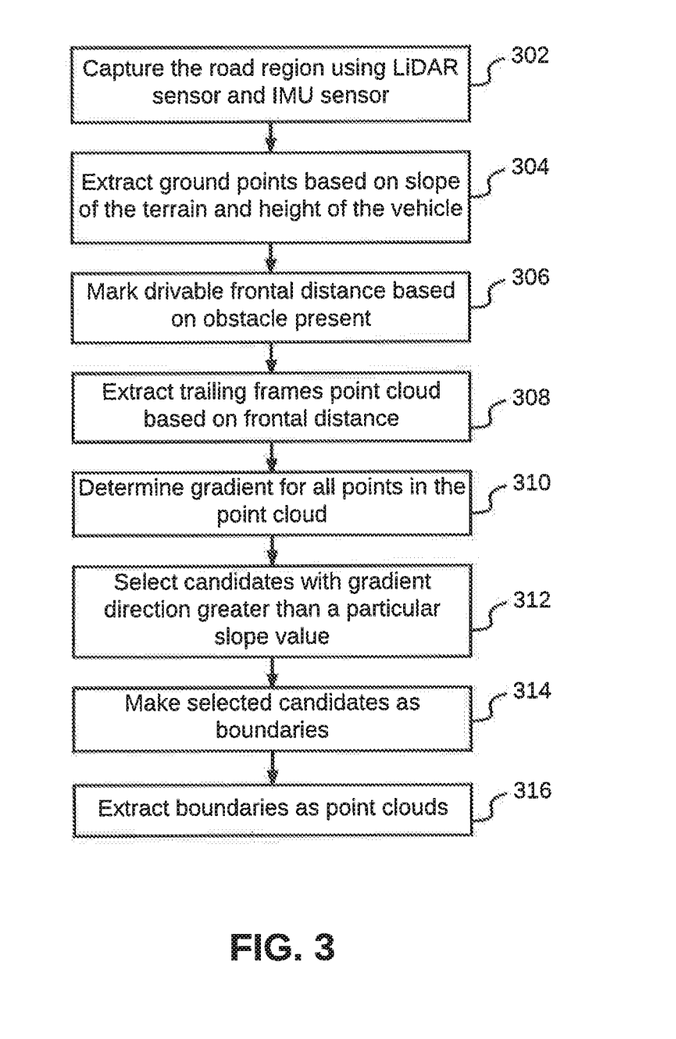
FIG. 3 illustrates a flow chart of method for guiding an autonomous vehicle, in accordance with another embodiment

Referring now to FIG. 3, a flowchart of a method for guiding autonomous vehicles while capturing a road region ahead of the autonomous vehicle in form of point cloud is illustrated. The capturing is in conjunction with the method as explained in FIG. 2. This method at step 302 involves capturing the road region using LiDAR and IMU sensors. In this step, the entire three-dimensional data of the road ahead of the autonomous vehicle is captured using the LiDAR sensor. The IMU sensor provides all inertial data like roll, pitch, and yaw which clarifies the slope in which the autonomous vehicle is positioned. Then at step 304, ground points are extracted based on slope of the road and height of the LiDAR sensor. The LiDAR sensor is placed on the autonomous vehicle is along a height at which ground points can be extracted to present the point cloud. If the point cloud directly points to the ground region then with appropriate thresholding, all the points representing ground can be extracted.

Thresholding of the points may be illustrated in below given equation:

```
Pseudo Code thresholding: Three-dimensional coordinates x,y,z, Z
For x,y,z in Point Cloud
If(abs(z-"height of LiDAR sensor") < threshold)
"Ground region append"(x,y,z)
```

Thereafter, drivable frontal distance is marked. The LiDAR data is analyzed for frontal free distance to avoid any obstacles present right in front of the autonomous vehicle depending on appropriate frontal distance. If no obstacles are present in front of the autonomous vehicle, then minimum safest distance is taken as the free region and if an obstacle is present right in front of the vehicle occluding the entire road region no extraction of data is done as it might lead to false detections.

Based on the frontal distance, at steps 308-316, trailing frames of LiDAR is taken for consecutive frames and for each point gradient is determined for all directions. If the gradient's magnitude and directions exceed a certain threshold, it is considered as the boundary of the road. As the curbs present in the boundaries can have sharp gradients it will be considered as boundaries. As the candidates for boundaries are selected, such boundaries are extracted as point clouds. Accordingly, the point clouds are extracted corresponding to the captured road region.

Figure 4:
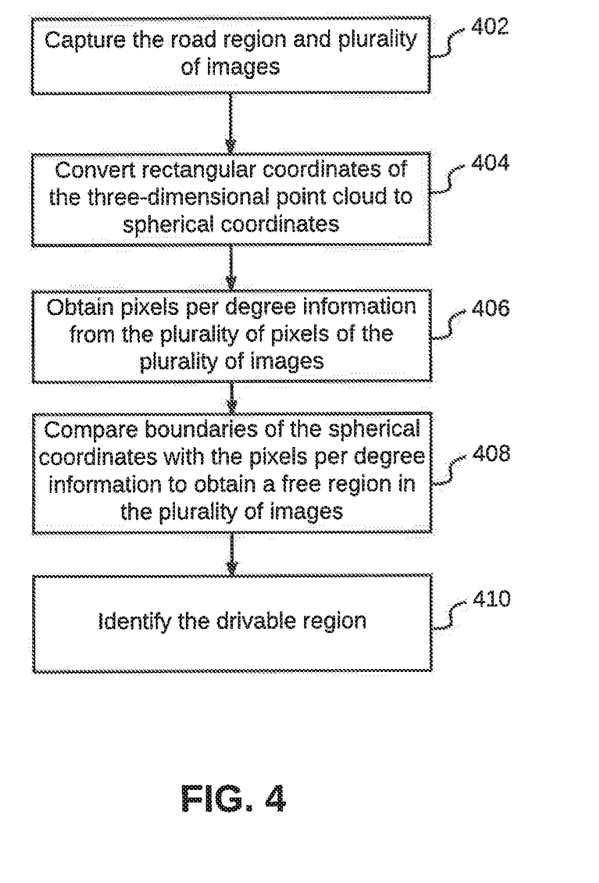
FIG. 4 illustrates a flow chart of method for guiding an autonomous vehicle, in accordance with yet another embodiment

Referring now to FIG. 4, a flowchart of a method for guiding autonomous vehicles while mapping captured road region with one or more images is illustrated, in accordance with an embodiment. The mapping is in conjunction with the method as explained in FIG. 2 and FIG. 3. The method at step 402 involves capturing the road region and the one or more images as explained in FIG. 2 and FIG. 3. The road region is captured as three-dimensional point cloud. Further, the one or more images include a plurality of pixels.

Then at step 404, rectangular coordinates of the three-dimensional point cloud are converted to spherical coordinates. The point cloud boundaries are initially converted from rectangular coordinates (x, y, z) to spherical coordinates (r, θ, φ).

Then at step 406, pixels per degree information is obtained corresponding to the plurality of pixels of the one or more images. In this step, the one or more images from the camera is analyzed for detecting parameters like field of view in vertical & horizontal directions, image height & width parameters in form of the plurality of pixels. Later, the pixels per degree for both azimuth and elevation angle is calculated for the image using all known parameters.

Thereafter at step 408, boundaries of the point cloud in form of the spherical coordinates is compared with the pixels per degree information. If the boundaries lie beyond the field of view (FOV) of the image, then entire width is considered as road region for a given frontal distance. Accordingly, a free region in the field of view of the image is identified.

Based on the free region, drivable region of the road is extracted for the autonomous vehicle. This step is explained in detail in conjunction with FIG. 5.

Figure 5:
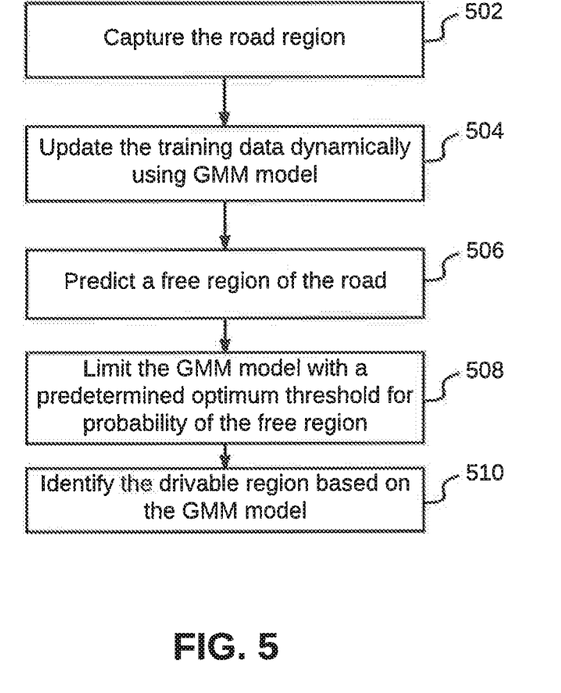
FIG. 5 illustrates a flow chart of method for guiding an autonomous vehicle, in accordance with still another embodiment

Referring now to FIG. 5, a flowchart of a method for guiding autonomous vehicles while extracting drivable region on the road is illustrated, in accordance with an embodiment. The method is in conjunction with the method as explained in FIG. 2, FIG. 3, and FIG. 4. The method at step 502 involves capturing the road region. The road region is captured as explained in above figures.

Then at step 504, a training data is dynamically updated using Gaussian Mixture Module Model (GMM). In this step, core learning is carried out in terms of gaussians distribution. The GMM Model is calculated by using below relation to extract patch of sample image before region extraction:

$$p(x; a_k, S_k, \pi_k) = \sum_{k=1}^{m} \pi_k p_k(x), \pi_k \geq 0, \sum_{k=1}^{m} \pi_k = 1,$$

$$p_k(x) = \varphi(x; a_k, S_k) = \frac{1}{2\pi^{d/2}|S_k|^{1/2}} \exp\left\{\frac{-1}{2}(x - a_k)^T S_k^{-1}(x - a_k)\right\}$$

Where m is the number of mixtures, $p_k$ is the normal distribution density with the mean $a_k$ and covariance matrix $S_k$, $\pi_k$ is the weight of the $k^{th}$ mixture.

The extracted patch of image is then used to create GMM models in two different color spaces RGB and LUV, where the RGB color space will take care of spatial color of road, LUV color space will help in modeling for various lighting conditions like shadows. Additionally, the two GMM models helps to determine the characteristics like general road region and other possible road textures that are available on roads as different colored lanes/patch modified roads. Considering two different color spaces, it allows to model the road region even for shadowed region before training, and creating the two GMM models. Further, these GMM models need not be replaced for different frames as it can be updated with respect to previous model parameters and this updating helps to handle sudden light changes in environment.

After training phase, at step 506, a free region is predicted for the road ahead of the autonomous vehicle. To predict the free region, entire image is predicted using Effective Modulus (EM) model through pixel by pixel mapping and threshold is applied to the return probabilities of best candidates to extract road region. Accordingly, the free region is identified.

Then thresholding of the GMM model for optimum value is performed at step 508. The thresholding depends on how fine the road region can vary in the image as it can extract different patches of road regions for different threshold values. The final road region is extracted which are connected to the initial patch image, this process is done to reduce the noise in the image while predicting the road region. Accordingly, drivable region of the road is extracted at step 510.

Figure 6:
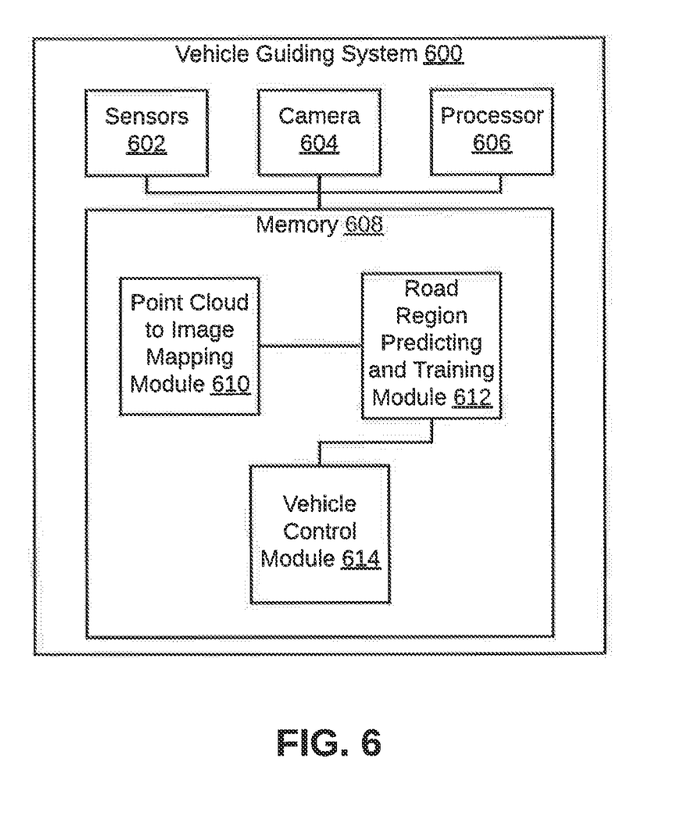
FIG. 6 illustrates a block diagram for a system for guiding am autonomous vehicle.

Referring now to FIG. 6, a block diagram of various modules within a vehicle guiding system 600 is illustrated, in accordance with an embodiment. Vehicle guiding system 600 may be a control system installed within an autonomous vehicle. Alternately vehicle guiding system 600 may be utilized to remotely control the autonomous vehicle. Vehicle guiding system 600 denotes hardware and software based module that is directly connected to or indirectly connected through one or more intermediate components. The exemplary system may be implemented in a variety of miniature computing systems, such a notebook, a smart phone, a tablet and a server. The exemplary system is adapted to exchange data with other components or service provider using a wide area network/Internet. Further, the exemplary system contains the following modules.

Vehicle guiding system 600 includes a plurality of sensors 602 for capturing a road region ahead of the autonomous vehicle. Plurality of sensors 602 include LiDAR sensors and IMU sensors. Plurality of sensors 602 may include any similar three-dimensional sensors. Plurality of sensors 602 capture the road region as three-dimensional point clouds. In an embodiment, Plurality of sensors 602 include a module for dynamic road region extraction. The module extracts the road region as explained in conjunction with FIG. 2 and FIG. 3. In an alternate embodiment, the module for dynamic road region extraction is included in a memory of Vehicle guiding system 600.

Vehicle guiding system 600 also includes a camera 604. Camera 604 may be a digital camera or a photographic camera. Camera 604 captures plurality of images of the road ahead of the autonomous vehicle.

Further, vehicle guiding system 600 includes a processor 606, which is communicatively coupled plurality of sensors 602, camera 604, and a memory 608 that is operatively coupled to each of processor 606, plurality of sensors 602, and camera 604. Memory 608 includes instructions stored thereon, that cause processor 606, on execution to guide the autonomous vehicle. Memory 608 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

These instructions in memory 608 may be stored as various modules, i.e., a point cloud to image mapping module 610, a road region predicting and training module 612, and a vehicle control module 614. The point cloud to image mapping module utilizes the point cloud of captured road region and maps the same with one or more images captured by the camera. This has been explained in detail in conjunction with FIG. 4.

Memory 608 further includes the road region predicting and training module 612. Road region predicting and training module 612 is involved in training vehicle guiding system 600 dynamically about updated information corresponding to the road. The training data is developed by learning and updating past data about the road. Information about the ground region of the road is extracted from the three-dimensional point cloud and the one or more images captured using the camera. Thereafter, the training data and the mapping data are utilized to predict the drivable region of the road. The drivable road region is a free region or a region of the road, where the autonomous vehicle can drive through. This has been explained in detail in conjunction with FIG. 5.

Thereafter, vehicle control module 614 utilizes the predicted information for drivable road region to control and navigate the autonomous vehicle.

The vehicle control module 614 identifies where the autonomous vehicle is with respect to the given scene. This module identifies best possible path to reach a given destination on the drivable region making the navigation smoother throughout the course of navigation. This is explained in detail in conjunction with FIG. 2.

Figure 7:
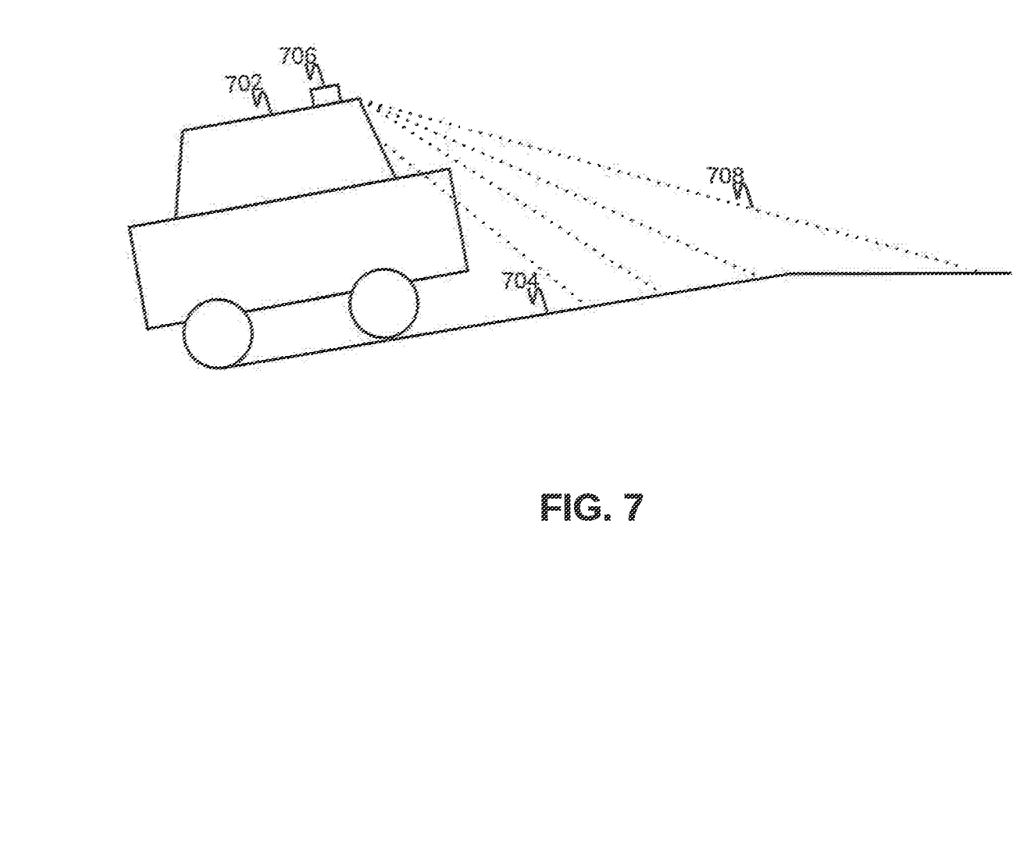
FIG. 7 illustrates an autonomous vehicle in up-hill road terrain scenario, in accordance with an embodiment.
Figure 8:
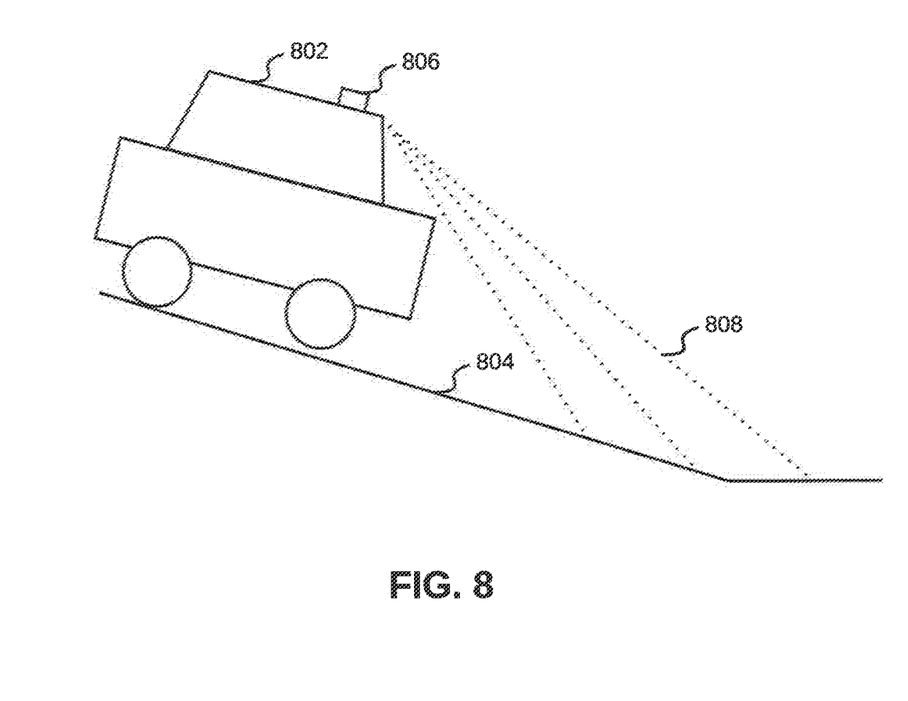
FIG. 8 illustrates an autonomous vehicle in down-hill road terrain scenario, in accordance with an embodiment.

Referring now to FIG. 7 and FIG. 8, a scenario of various road conditions is illustrated. FIG. 7 captures the road condition for up-hill slope and FIG. 8 captures the road condition for down-hill slope.

If the autonomous vehicle is moving towards the top of a slope, then some points might fall on flat ground region making the system to confuse with the open space or steep slope or if the autonomous vehicle is moving downwards towards end of the slope the system might confuse the terrain with obstacle. In the given scenario, the LiDAR sensor utilizes scan lines with trailing frames along with the IMU sensor that allows the system to understand sudden changes in terrain. If the terrain is inclined at an angle then the point cloud along with this inclination is considered as ground region. The LiDAR data is again analyzed for frontal free distance to avoid any obstacles present right in front of the vehicle depending on appropriate frontal distance. If no obstacles are present in front of vehicle, then minimum safest distance is taken as the free region and if an obstacle is present right in front of the vehicle occluding the entire road region no extraction of data is done as it might lead to false detections.

In FIG. 7 an uphill road condition is depicted such that road 704 has a positive slope. In this scenario, some scan lines may be travelling far to hit the ground. Such scan lines having far distance travel may not be utilized in overall calculation. Such scan lines will depict that an up-hill slope is ahead of the autonomous vehicle.

In FIG. 8 a down-hill road condition is depicted, such that road 804 has a negative slope. In this scenario, some scan lines may hit the ground early and identify it as an obstacle. Then based on distance traveled by the scan lines and texture of the road, the down-hill condition may be depicted.

Figure 9:
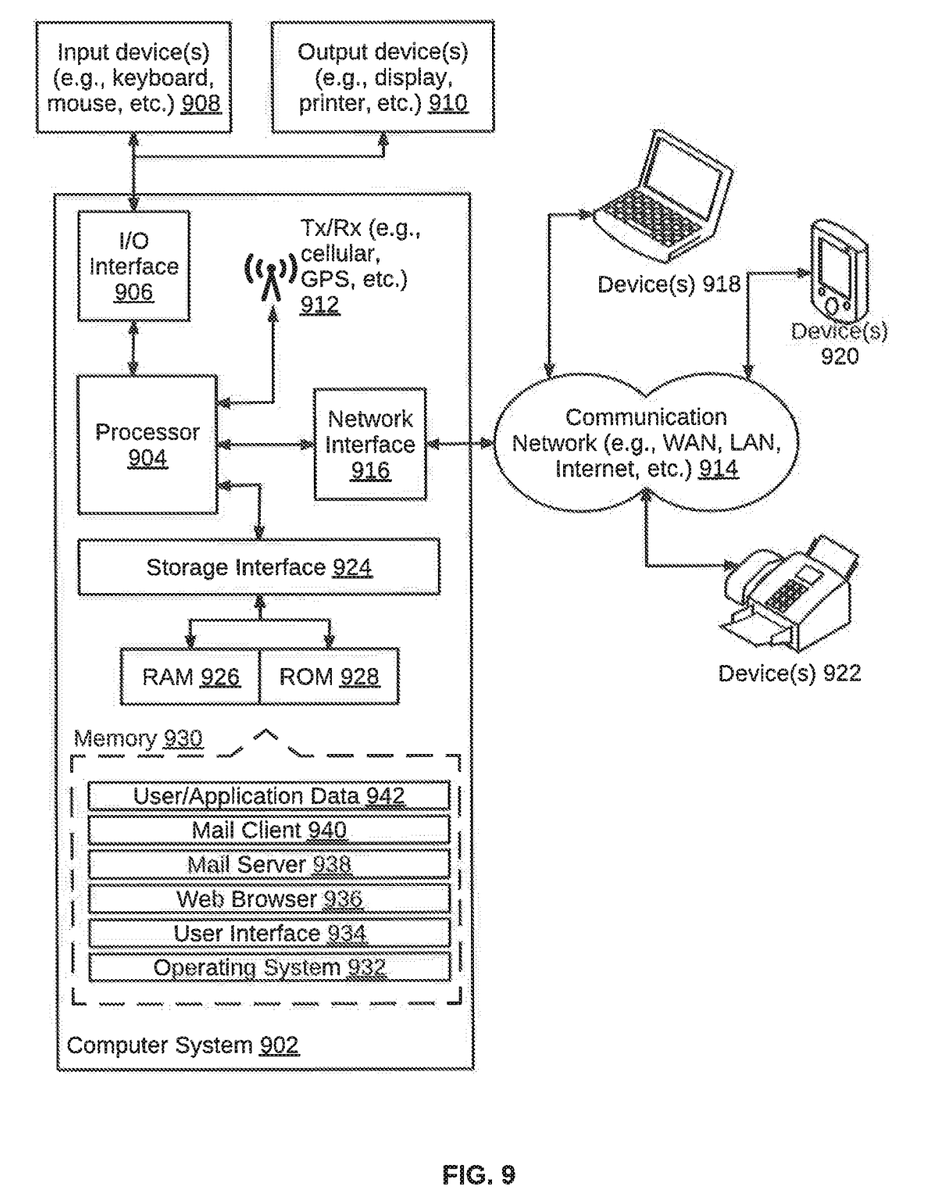
FIG. 9 illustrates a block diagram of an exemplary computer system for implementing various embodiments.

Referring now to FIG. 9, a block diagram of an exemplary computer system for implementing various embodiments is illustrated. Computer system 902 may include a central processing unit ("CPU" or "processor") 904 that includes at least one data processor for executing program components for executing user-generated requests or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 99 may be a printer, fax machine, video display (e.g., cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (e.g., using Wireless Application Protocol), the Internet, etc. Using network interface 916 and communication network 914, computer system 902 may communicate with devices 918, 920, and 922. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of the devices.

In some embodiments, processor 904 may be disposed in communication with one or more memory devices (e.g., RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (e.g., any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method, system, and device for guiding autonomous vehicles based on dynamic extraction of road region. With the provided solution, the autonomous vehicle can navigate safely independent of any lighting conditions and system doesn't fail on any kind of textured roads. Even if a road contains multiple obstacles, only drivable road region is extracted to guide the autonomous vehicle. Additionally, as different color space is used, the provided solution works on any terrain surface and different lighting conditions without being explicitly trained.

The specification has described method, system, and device for guiding autonomous vehicles based on dynamic extraction of road region. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for guiding an autonomous vehicle, the method comprising:

capturing a road region ahead of the autonomous vehicle using a plurality of sensors, wherein a texture of the road region is captured as a three-dimensional point cloud;

capturing a plurality of images of the road ahead the autonomous vehicle using a camera;

mapping the road region to the plurality of images, wherein the three-dimensional point cloud is mapped to a plurality of pixels within the plurality of images;

converting rectangular coordinates of the three-dimensional point cloud to spherical coordinates;

obtaining pixels per degree information from the plurality of pixels of the plurality of images;

comparing boundaries of the spherical coordinates with the pixels per degree information to obtain a free region in the plurality of images, wherein the free region is associated with a drivable region of the road;

predicting the drivable region of the road based on the mapping and a training data, wherein the training data comprises dynamically updated information about the road; and controlling the autonomous vehicle based on the predicted drivable region of the road.

2. The method of claim 1, wherein at least one sensor of the plurality of sensors is a Light Detection and Ranging (LiDAR) sensor.

3. The method of claim 1, wherein at least one sensor of the plurality of sensors is an Inertial Measurement Unit (IMU).

4. The method of claim 1, wherein the three-dimensional point cloud is based on a slope of the road.

5. The method of claim 1, wherein predicting the drivable region of the road further comprises:

creating a Gaussian Mixture Model (GMM) based on the mapping, wherein the GMM describes at least one of a spatial color condition and a lighting condition of the road;

updating the training data dynamically using the GMM model, wherein the updating is based on a deviation of the GMM model from a past training data; and extracting the drivable region of the road based on the GMM model and the updated training data.

6. The method of claim 5, wherein extracting the drivable region of the road further comprises:

predicting a free region of the road based on the updated training data;

limiting the GMM model with a predetermined optimum threshold for probability of the free region; and identifying the drivable region based on the GMM model.

7. The method of claim 1, wherein controlling the autonomous vehicle further comprises maneuvering the autonomous vehicle in case the predicted drivable region of the road is above a first threshold value, wherein the first threshold value defines an available value of the drivable region of the road through which the autonomous vehicle can drive-through.

8. The method of claim 1, wherein controlling the autonomous vehicle further comprises halting the autonomous vehicle in case the predicted drivable region of the road is below a second threshold value, wherein the second threshold value defines an available value of the drivable region of the road through which the autonomous vehicle is restricted to drive-through.

9. A system for guiding an autonomous vehicle, the system comprising:

a plurality of sensors configured to capture a road region ahead of the autonomous vehicle, wherein a texture of the road region is captured as a three-dimensional point cloud;

a camera for capturing a plurality of images of the road region ahead of the autonomous vehicle;

a processor coupled to the plurality of sensors and the camera;

a memory communicatively coupled to the processor and having processor instructions stored thereon, causing the processor, on execution to:

map the road region to the plurality of images, wherein the three-dimensional point cloud is mapped to a plurality of pixels within the plurality of images;

convert rectangular coordinates of the three-dimensional point cloud to spherical coordinates;

obtain pixels per degree information from the plurality of pixels of the plurality of images;

compare boundaries of the spherical coordinates with the pixels per degree information to obtain a free region in the plurality of images, wherein the free region is associated with a drivable region of the road; and predict the drivable region of the road based on the mapping and a training data, wherein the training data comprises dynamically updated information about the road; and a vehicle control system configured to control the autonomous vehicle based on the predicted drivable region of the road.

10. The system of claim 9, wherein at least one sensor of the plurality of sensors is a Light Detection and Ranging (LiDAR) sensor.

11. The system of claim 9, wherein at least one sensor of the plurality of sensors is an Inertial Measurement Unit (IMU).

12. The system of claim 9, wherein the processor instructions further cause the processor to:

create a Gaussian Mixture Model (GMM) based on the mapping, wherein the GMM describes at least one of a spatial color condition and a lighting condition of the road;

update the training data dynamically using the GMM model; wherein the update is based on a deviation of the GMM model from past training data; and extract the drivable region of the road based on the GMM model and the updated training data.

13. The system of claim 12, wherein processor instructions further cause the processor to:

predict a free region of the road based on the updated training data;

limit the GMM model with a predetermined optimum threshold for probability of the free region; and identify the drivable region based on the GMM model.

14. A vehicle control device for guiding an autonomous vehicle, the vehicle control device comprising:

a plurality of sensors configured to capture a road region ahead of the autonomous vehicle, wherein a texture of the road region is captured as a three-dimensional point cloud;

a camera for capturing a plurality of images of the road region ahead of the autonomous vehicle;

a processor communicatively coupled to the plurality of sensors and the camera; and a memory communicatively coupled to the processor and having processor instructions stored thereon, causing the processor, on execution to:

map the road region to the plurality of images, wherein the three-dimensional point cloud is mapped to a plurality of pixels within the plurality of images;

convert rectangular coordinates of the three-dimensional point cloud to spherical coordinates;

obtain pixels per degree information from the plurality of pixels of the plurality of images;

compare boundaries of the spherical coordinates with the pixels per degree information to obtain a free region in the plurality of images, wherein the free region is associated with a drivable region of the road;

predict the drivable region of the road based on the mapping and a training data, wherein the training data comprises a dynamically updated information about the road; and control the autonomous vehicle based on the predicted drivable region of the road.

15. The vehicle control device of claim 14, wherein the processor instructions further cause the processor to:

create a Gaussian Mixture Model (GMM) based on the mapping, wherein the GMM describes at least one of a spatial color condition and a lighting condition of the road;

update the training data dynamically using the GMM model; wherein the update is based on a deviation of the GMM model from past training data; and extract the drivable region of the road based on the GMM model and the updated training data.

16. The vehicle control device of claim 15, wherein processor instructions further cause the processor to:

predict a free region of the road based on the updated training data;

limit the GMM model with a predetermined optimum threshold for probability of the free region; and identify the drivable region based on the GMM model.

17. A non-transitory computer-readable storage medium comprising a set of computer executable instructions causing a vehicle control system of an autonomous vehicle that includes one or more processors to perform steps including:

capturing a road region ahead of the autonomous vehicle from a plurality of sensors, wherein a texture of the road region is captured as a three-dimensional point cloud;

capturing a plurality of images of the road ahead of the autonomous vehicle using a camera;

mapping the road region and the plurality of images, wherein the three-dimensional point cloud is mapped to a plurality of pixels within the plurality of images;

converting rectangular coordinates of the three-dimensional point cloud to spherical coordinates;

obtaining pixels per degree information from the plurality of pixels of the plurality of images;

comparing boundaries of the spherical coordinates with the pixels per degree information to obtain a free region in the plurality of images, wherein the free region is associated with a drivable region of the road;

predicting the drivable region of the road based on the mapping and a training data, wherein the training data comprises dynamically updated information about the road; and controlling the autonomous vehicle based on the predicted drivable region of the road.

* * * * *